(12) United States Patent
Eickholt et al.

(10) Patent No.: US 11,511,795 B2
(45) Date of Patent: Nov. 29, 2022

(54) DITHER NOISE MANAGEMENT IN ELECTRIC POWER STEERING SYSTEMS

(71) Applicant: STEERING SOLUTIONS IP HOLDING CORPORATION, Saginaw, MI (US)

(72) Inventors: Michael Eickholt, Chesaning, MI (US); Prerit Pramod, Saginaw, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 95 days.

(21) Appl. No.: 16/157,880

(22) Filed: Oct. 11, 2018

(65) Prior Publication Data
US 2020/0114949 A1    Apr. 16, 2020

(51) Int. Cl.
*B62D 5/04* (2006.01)
*H02P 6/10* (2006.01)

(52) U.S. Cl.
CPC .............. *B62D 5/0463* (2013.01); *H02P 6/10* (2013.01)

(58) Field of Classification Search
CPC ........ B62D 5/0463; B62D 6/008; B62D 6/02; B62D 6/08; H02P 6/10
See application file for complete search history.

(56) References Cited

U.S. PATENT DOCUMENTS

| 8,583,265 | B1 * | 11/2013 | Schulz | H02P 6/10 |
| | | | | 318/400.14 |
| 9,452,779 | B2 * | 9/2016 | Blond | B62D 5/20 |
| 2002/0043423 | A1 * | 4/2002 | Endo | B62D 5/0466 |
| | | | | 180/446 |
| 2002/0056587 | A1 * | 5/2002 | Shibasaki | B62D 5/0463 |
| | | | | 180/443 |
| 2002/0063539 | A1 * | 5/2002 | Tan | H02P 6/006 |
| | | | | 318/135 |
| 2003/0120404 | A1 * | 6/2003 | Endo | B62D 5/0463 |
| | | | | 701/41 |

(Continued)

FOREIGN PATENT DOCUMENTS

CN           2792901 Y       7/2006
CN         101678855 A       3/2010
(Continued)

OTHER PUBLICATIONS

English Translation of JP-4715212-B2 (Year: 2011).*

(Continued)

*Primary Examiner* — Thomas E Worden
(74) *Attorney, Agent, or Firm* — Dickinson Wright PLLC

(57) ABSTRACT

Technical solutions are described for attenuating dither noise in a steering system. An example method includes computing a torque command based on an input torque, and generating a current command corresponding to the torque command. Further, the method includes determining an adjustment parameter based on a plurality of steering system signals. Further, the method includes reducing dither noise of the steering system by dynamically modifying a controller parameter value using the adjustment parameter. Further, the method includes generating a voltage command using the current command and the modified controller parameter value, the voltage command used to generate torque by a motor.

19 Claims, 7 Drawing Sheets

(56) References Cited

U.S. PATENT DOCUMENTS

| | | | | |
|---|---|---|---|---|
| 2005/0251311 A1* | 11/2005 | Burton | ............... | B62D 5/0463 701/41 |
| 2008/0147276 A1* | 6/2008 | Pattok | ............... | B62D 5/0472 701/42 |
| 2009/0192679 A1* | 7/2009 | Kobayashi | ........... | B62D 5/0472 701/42 |
| 2011/0054737 A1* | 3/2011 | Naik | ............... | B62D 5/0463 701/41 |
| 2013/0066520 A1* | 3/2013 | Hales | ............... | B62D 5/0463 701/41 |
| 2015/0239491 A1* | 8/2015 | Bolourchi | ............... | B62D 5/04 701/41 |
| 2018/0170422 A1* | 6/2018 | Yoshida | ............... | B62D 5/046 |
| 2019/0126971 A1* | 5/2019 | Kim | ............... | B62D 5/006 |
| 2019/0276073 A1* | 9/2019 | Pramod | ............... | B62D 5/0481 |
| 2020/0339186 A1* | 10/2020 | Tamaizumi | ........... | B62D 15/021 |

FOREIGN PATENT DOCUMENTS

| | | |
|---|---|---|
| CN | 103329425 A | 9/2013 |
| CN | 104802848 A | 7/2015 |
| CN | 105189254 A | 12/2015 |
| CN | 105209320 A | 12/2015 |
| CN | 107000785 A | 8/2017 |
| CN | 107161032 A | 9/2017 |
| DE | 102007044579 A1 | 9/2008 |
| JP | S62234783 A | 10/1987 |
| JP | 2004161118 A | 6/2004 |
| JP | 4715212 B2 * | 7/2011 ........... B62D 5/0463 |
| JP | 2014058295 A | 4/2014 |
| WO | 2017195883 A1 | 11/2017 |
| WO | 2018008110 A1 | 1/2018 |

OTHER PUBLICATIONS

Official Letter received from the German Patent and Trademark Office for related German Patent Application No. 102019127167.3 dated Nov. 9, 2021, 6 page(s), English Translation of the Official Letter Included.

Chinese Office Action and Search Report from the Chinese Patent Office for related Chinese Application No. 201910963784.0 dated Sep. 14, 2021, 11 page(s).

Second Chinese Office Action dated Mar. 14, 2022 for Chinese Application No. 201910963784.0, 8 pages.

* cited by examiner

DITHER NOISE MANAGEMENT IN ELECTRIC POWER STEERING SYSTEMS

BACKGROUND

Dither noise, as specified here, refers to a low frequency noise that typically exists in electric motor systems, such as Electric Power Steering (EPS) systems. The existing evidence suggests that the primary source of the dither noise is a handwheel torque sensor used in the EPS system. The sensed torque signal has noise due to inherent noise in the sensed analog signals, quantization noise in digital sensors as well as A/D converters, among other causes. Due to the use of handwheel torque signal for the purposes of providing assist to the driver, the noise in the sensed signal propagates through the software as well as the hardware (inverter, motor etc.). The dither noise causes discomfort for an operator of the EPS system. Accordingly, it is desirable to reduce, if not completely eliminate the dither noise in systems such as EPS systems.

SUMMARY

Technical solutions are described for attenuating dither noise in a steering system. An example method includes computing a torque command based on an input torque, and generating a current command corresponding to the torque command. Further, the method includes determining an adjustment parameter based on a plurality of steering system signals. Further, the method includes reducing dither noise of the steering system by dynamically modifying a controller parameter value using the adjustment parameter. Further, the method includes generating a voltage command using the current command and the modified controller parameter value, the voltage command used to generate torque by a motor.

According to one or more embodiments, an apparatus for managing dither noise in a steering system includes a motor, and a motor control system. The motor control system includes a current command generator that generates a current command corresponding to a motor torque command. The motor control system further includes a current controller that generates a voltage command based on the current command using one or more controller parameters. The motor control system further includes a motor control parameter estimator that determines estimated motor parameters. The motor control system further includes a dither noise manager that determines an adjustment parameter based on a plurality of steering system signals, and filters the dither noise of the steering system by dynamically modifying the one or more controller parameters using the adjustment parameter, the current controller generating the voltage command corresponding to the current command using the modified one or more controller parameters, the voltage command used to generate torque by the motor.

According to one or more embodiments, a steering system includes a motor that generates an amount of torque corresponding to a motor torque command. The steering system further includes a motor control system that generates a voltage command based on the motor torque command, the voltage command being applied to the motor to generate the amount of torque. The steering system further includes multiple sensors that measure corresponding steering system signals. The steering system further includes a dither noise manager that reduces dither noise in the steering system based on the plurality of steering system signals by modifying one or more controller parameters used to compute the voltage command.

These and other advantages and features will become more apparent from the following description taken in conjunction with the drawings.

BRIEF DESCRIPTION OF THE DRAWINGS

The subject matter of the present disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

Referring now to the Figures, where the present disclosure will be described with reference to specific embodiments, without limiting the same, it is to be understood that the disclosed embodiments are merely illustrative of the present disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

As used herein the terms module and sub-module refer to one or more processing circuits such as an application specific integrated circuit (ASIC), an electronic circuit, a processor (shared, dedicated, or group) and memory that executes one or more software or firmware programs, a combinational logic circuit, and/or other suitable components that provide the described functionality. As can be appreciated, the sub-modules described below can be combined and/or further partitioned.

Figure 1:
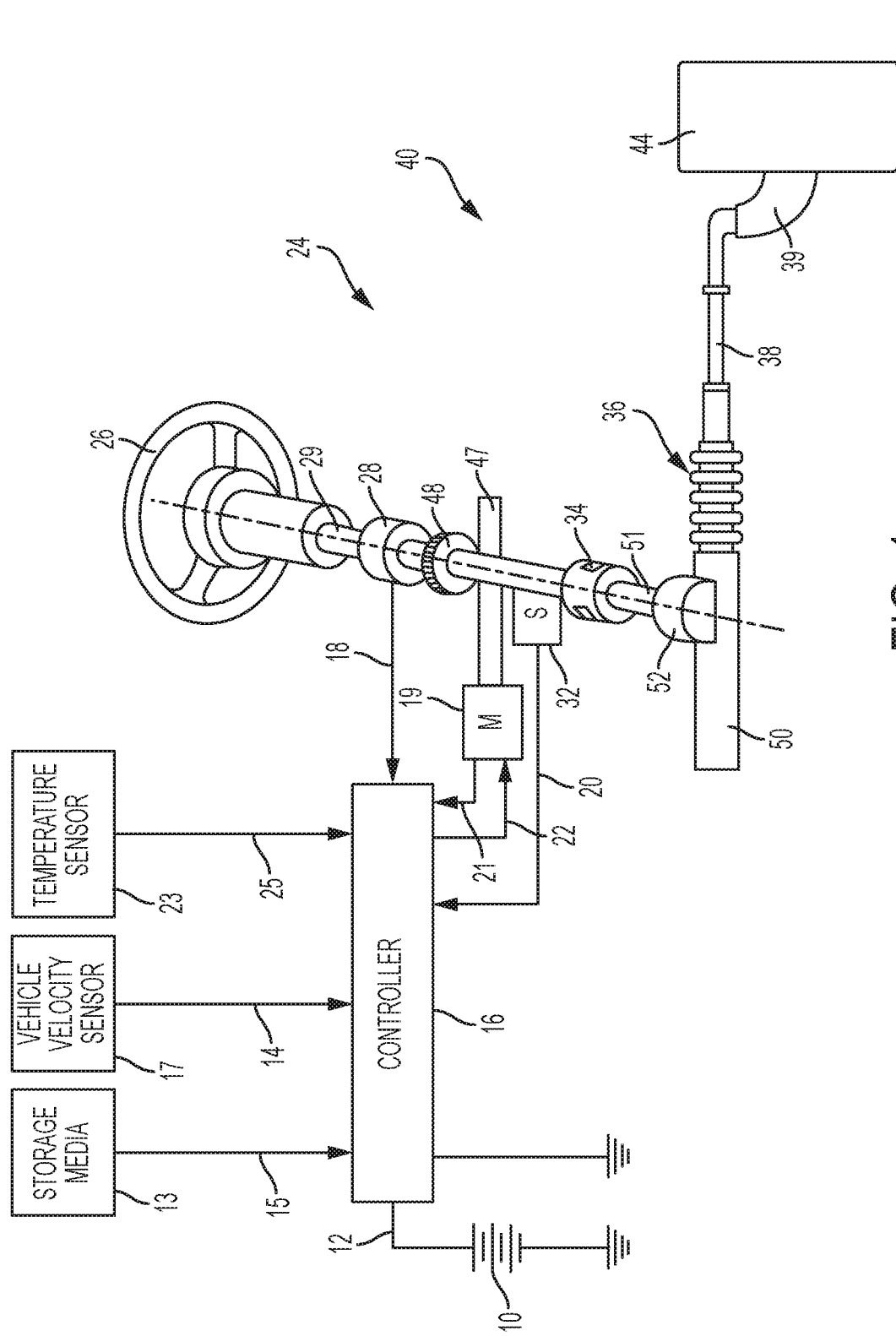
FIG. 1 is an exemplary embodiment of an EPS system according to one or more embodiments.

Referring now to the Figures, where the technical solutions will be described with reference to specific embodiments, without limiting same, FIG. 1 is an exemplary embodiment of an electric power steering system (EPS) 40 suitable for implementation of the disclosed embodiments.

The steering mechanism 36 is a rack-and-pinion type system and includes a toothed rack (not shown) within housing 50 and a pinion gear (also not shown) located under gear housing 52. As the operator input, hereinafter denoted as a steering wheel 26 (e.g. a hand wheel and the like), is turned, the upper steering shaft 29 turns and the lower steering shaft 51, connected to the upper steering shaft 29 through universal joint 34, turns the pinion gear. Rotation of the pinion gear moves the rack, which moves tie rods 38 (only one shown) in turn moving the steering knuckles 39 (only one shown), which turn a steerable wheel(s) 44 (only one shown).

Electric power steering assist is provided through the control apparatus generally designated by reference numeral 24 and includes the controller 16 and an electric machine 19, which could be a permanent magnet synchronous motor, and is hereinafter denoted as motor 19. The controller 16 is powered by the vehicle power supply 10 through line 12. The controller 16 receives a vehicle speed signal 14 representative of the vehicle velocity from a vehicle velocity sensor 17. Steering angle is measured through position sensor 32, which may be an optical encoding type sensor, variable resistance type sensor, or any other suitable type of position sensor, and supplies to the controller 16 a position signal 20. Motor velocity may be measured with a tachometer, or any other device, and transmitted to controller 16 as a motor velocity signal 21. A motor velocity denoted $\omega_m$ may be measured, calculated or a combination thereof. For example, the motor velocity $\omega_m$ may be calculated as the change of the motor position $\theta$ as measured by a position sensor 32 over a prescribed time interval. For example, motor speed $\omega_m$ may be determined as the derivative of the motor position $\theta$ from the equation $\omega_m = \Delta\theta/\Delta t$ where $\Delta t$ is the sampling time and $\Delta\theta$ is the change in position during the sampling interval. Alternatively, motor velocity may be derived from motor position as the rate of change of position with respect to time. It will be appreciated that there are numerous well-known methodologies for performing the function of a derivative.

As the steering wheel 26 is turned, torque sensor 28 senses the torque applied to the steering wheel 26 by the vehicle operator. The torque sensor 28 may include a torsion bar (not shown) and a variable resistive-type sensor (also not shown), which outputs a variable torque signal 18 to controller 16 in relation to the amount of twist on the torsion bar. Although this is one type of torque sensor, any other suitable torque-sensing device used with known signal processing techniques will suffice. In response to the various inputs, the controller sends a command 22 to the electric motor 19, which supplies torque assist to the steering system through worm 47 and worm gear 48, providing torque assist to the vehicle steering.

It should be noted that although the disclosed embodiments are described by way of reference to motor control for electric steering applications, it will be appreciated that such references are illustrative only and the disclosed embodiments may be applied to any motor control application employing an electric motor, e.g., steering, valve control, and the like. Moreover, the references and descriptions herein may apply to many forms of parameter sensors, including, but not limited to torque, position, speed and the like. It should also be noted that reference herein to electric machines including, but not limited to, motors, hereafter, for brevity and simplicity, reference will be made to motors only without limitation.

In the control system 24 as depicted, the controller 16 utilizes the torque, position, and speed, and like, to compute a command(s) to deliver the required output power. Controller 16 is disposed in communication with the various systems and sensors of the motor control system. Controller 16 receives signals from each of the system sensors, quantifies the received information, and provides an output command signal(s) in response thereto, in this instance, for example, to the motor 19. Controller 16 is configured to develop the corresponding voltage(s) out of inverter (not shown), which may optionally be incorporated with controller 16 and will be referred to herein as controller 16, such that, when applied to the motor 19, the desired torque or position is generated. In one or more examples, the controller 24 operates in a feedback control mode, as a current regulator, to generate the command 22. Alternatively, in one or more examples, the controller 24 operates in a feedforward control mode to generate the command 22. Because these voltages are related to the position and speed of the motor 19 and the desired torque, the position and/or speed of the rotor and the torque applied by an operator are determined. A position encoder is connected to the steering shaft 51 to detect the angular position $\theta$. The encoder may sense the rotary position based on optical detection, magnetic field variations, or other methodologies. Typical position sensors include potentiometers, resolvers, synchros, encoders, and the like, as well as combinations comprising at least one of the forgoing. The position encoder outputs a position signal 20 indicating the angular position of the steering shaft 51 and thereby, that of the motor 19.

Desired torque may be determined by one or more torque sensors 28 transmitting torque signals 18 indicative of an applied torque. One or more exemplary embodiments include such a torque sensor 28 and the torque signal(s) 18 therefrom, as may be responsive to a compliant torsion bar, T-bar, spring, or similar apparatus (not shown) configured to provide a response indicative of the torque applied.

In one or more examples, a temperature sensor(s) 23 located at the electric machine 19. Preferably, the temperature sensor 23 is configured to directly measure the temperature of the sensing portion of the motor 19. The temperature sensor 23 transmits a temperature signal 25 to the controller 16 to facilitate the processing prescribed herein and compensation. Typical temperature sensors include thermocouples, thermistors, thermostats, and the like, as well as combinations comprising at least one of the foregoing sensors, which when appropriately placed provide a calibratable signal proportional to the particular temperature.

The position signal 20, velocity signal 21, and a torque signal(s) 18 among others, are applied to the controller 16. The controller 16 processes all input signals to generate values corresponding to each of the signals resulting in a rotor position value, a motor speed value, and a torque value being available for the processing in the algorithms as prescribed herein. Measurement signals, such as the above mentioned are also commonly linearized, compensated, and filtered as desired to enhance the characteristics or eliminate undesirable characteristics of the acquired signal. For example, the signals may be linearized to improve processing speed, or to address a large dynamic range of the signal. In addition, frequency or time based compensation and filtering may be employed to eliminate noise or avoid undesirable spectral characteristics.

In order to perform the prescribed functions and desired processing, as well as the computations therefore (e.g., the identification of motor parameters, control algorithm(s), and the like), controller 16 may include, but not be limited to, a processor(s), computer(s), DSP(s), memory, storage, register(s), timing, interrupt(s), communication interface(s), and input/output signal interfaces, and the like, as well as combinations comprising at least one of the foregoing. For example, controller 16 may include input signal processing and filtering to enable accurate sampling and conversion or acquisitions of such signals from communications interfaces. Additional features of controller 16 and certain processes therein are thoroughly discussed at a later point herein.

As described earlier, dither noise refers to a low frequency noise that exists in an EPS system, typically originating from the handwheel torque sensor and the associated signal processing. The sensed torque signal has noise due to inherent noise in the sensed analog signals, quantization noise in digital sensors as well as A/D converters. Dither noise causes discomfort for an operator of the EPS system. Accordingly, it is desirable to reduce, if not completely eliminate the dither noise in systems such as EPS systems. The dither noise generally contains frequency noise content, the range of frequency noise may vary for different systems, and is typically around 200 to 250 Hz. In some cases the frequency range of the dither noise may coincide with the software loop rates, or may include frequency noise due to pulse width management (PWM) and inverter switching.

Typically, dither noise is reduced or managed by multiple techniques including tuning of steering system level control functions that amplify noise (high-frequency assist, inertia compensation etc.), oversampling filtering of the digital handwheel torque sensor signals, using analog sensors, employing conditional filters on the motor torque command, reducing the motor control bandwidth versus motor velocity and vehicle speed, and the like. The reduction of motor current (or torque) control bandwidth results in performance degradation since the motor control system acts as a low-pass filter during fast maneuvers.

The technical solutions described herein address such technical challenge of managing and/or reducing dither noise. In one or more examples, the technical solutions described herein improve the motor control bandwidth scheduling techniques by introducing additional constraints on the allowed space where the motor current control bandwidth may be varied. In particular, motor acceleration and handwheel torque signals are used to further vary the bandwidth. This facilitates for attenuation of dither noise, while maintaining the stability and performance of the entire EPS system.

Figure 2:
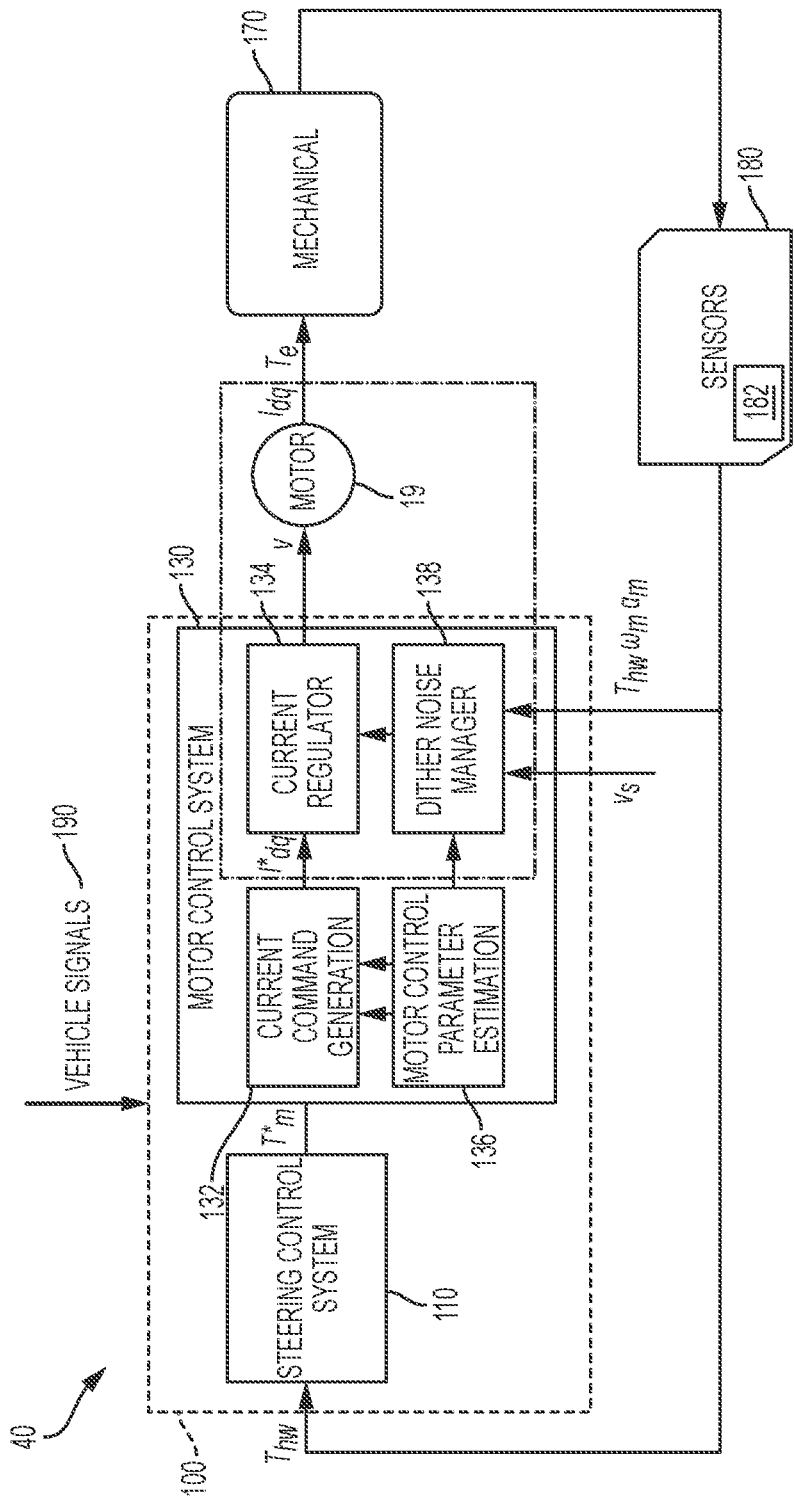
FIG. 2 depicts an EPS control system with dither noise management according to one or more embodiments.

FIG. 2 depicts a control system 100 for an EPS system with dither noise management according to one or more embodiments. FIG. 2 represents the EPS system 40 using blocks for the motor 19 that provides torque ($T_e$) to the mechanical system 170 that is responsible for transferring the torque to the road-wheels in order to steer the vehicle. The mechanical system 170 varies depending on the type of the EPS system 40, for example, if the EPS system 40 is a steer by wire system, the mechanical system 170 may include more electric signal transferring components instead of (and/or in addition to) a drive-shaft and other mechanical components in a typical power steering system.

The control system 100 includes a steering control system 110 that generates a torque command ($T_m^*$) for maneuvering the vehicle. In one or more examples, the steering control system 110 may include the steering wheel 26 operated by a human operator.

The torque command generated by the steering control system 110 is provided to the motor 19 to generate assist torque. The torque is generated by the motor 19 when the appropriate motor voltage commands are applied to it by a motor control system 130, which may be a motor control system that operates using a feedback and/or feedforward operation mode. In one or more examples, the motor control system 100 monitors the torque that is generated by the mechanical system 170 using one or more sensors 180. The output from the sensors 180, which include one or more measurement signals, such as a motor position, motor velocity, vehicle speed, and the like are used by the motor control system 130 to operate the feedback/feedforward operation. The sensors 180 include a handwheel torque sensor 182, which measures the handwheel torque ($T_{hw}$) being applied to the steering wheel 26. The dither noise is part of the handwheel torque signal. A handwheel torque sensor 182 can also be used in steer by wire systems.

In one or more examples, the motor control system 130 further includes a current command generator 132, a current controller 134, a motor control parameter estimator 136, and a dither noise manager 138, among other components. The motor control system 130 can receive vehicle control signals 190, which can include vehicle speed, vehicle acceleration/deceleration, yaw rate, lateral acceleration, and other such control signals and sensor measurements from electronic control units (ECUs) in the vehicle via intra-vehicle communication network, such as a controller area network (CAN) bus, and the like.

The current command generator 132 converts the motor torque command ($T_m^*$) into corresponding current commands ($I_{dq}^*$) in the d-axis and q-axis frame of reference (also known as the synchronously rotating reference frame). The current commands are applied to the motor 19, by applying a corresponding voltage (V; referred to as "voltage command" in some cases) across the motor 19. The current controller 134 generates the voltage command based on the current commands. It should be noted that in one or more examples, the current commands may be in different reference frames than the dq reference frame, for example, three-phase abc-reference frame (also referred to as the stationary reference frame), and the like. In one or more examples, the current controller 134 may be a feedback type regulator, or a feedforward controller. Different types of feedback current regulators may be used, including decoupling regulators, proportional-integral (PI) controllers, and the like.

In one or more examples, the gains of the current command generator 132 are set according to estimates of motor parameters. The motor control parameter estimator 136 can provide estimates of the motor parameters, such as motor resistance, motor induction, and the like. Alternatively, the current command generator 132 can determine the current commands from the motor torque command using any other technique. The current commands are used to apply the corresponding voltage (V) to the motor 19.

The motor 19, in turn generates a torque ($T_e$) that is provided to the mechanical system 170. The motor 19 also generates output currents ($I_{dq}^*$). The sensors 180, in one or more examples, measure one or more EPS signals, such as the output torque, the output currents, the motor position, the motor velocity, and the like which are then used by the motor control system 130, for example as part of a closed loop control system, to generate the voltage command in a next iteration.

The dither noise manager 138 monitors the one or more EPS signals to perform bandwidth scheduling or gain scheduling of the motor control system 130 to facilitate dither noise management. When a decoupling current regulator is used as the current controller 134, the ideal current control transfer function is substantially an ideal low pass filter of a particular order (e.g. first order, second order, etc.). Further, a current controller 134, either a static or dynamic type, can also have a response that substantially matches that of a low-pass filter.

Figure 3:
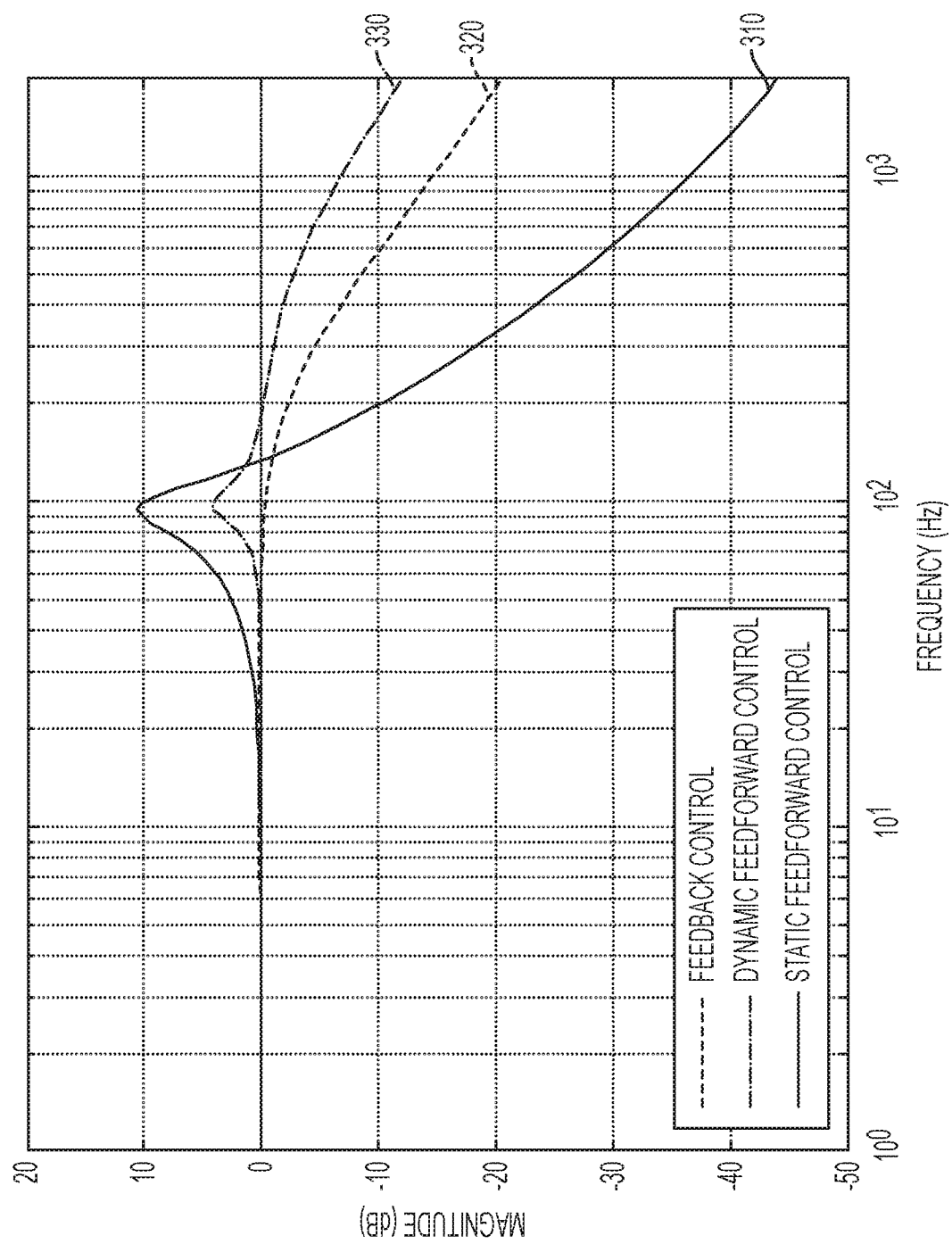
FIG. 3 depicts frequency responses of a q-axis current control loop for a motor control system including a decoupling current regulator and a feedforward current controller according to one or more embodiments.

FIG. 3 depicts frequency responses of a q-axis current control loop for a motor control system 130 including a decoupling regulator and a current controller according to one or more embodiments. As illustrated, the frequency response shape is similar to that of a low-pass filter. Thus, the current commands ($I_{dq}$*), which are derived from the handwheel torque sensor signals can be filtered as the frequency responses are shaped to become reduced cutoff frequency low-pass filters.

The dither noise manager 138 accordingly uses the one or more EPS signals from the sensors 180 to manage the dither noise of the EPS system 40 by modifying the controller parameters that are based on the estimated motor control parameters from the motor control parameter estimator 136. The modified controller parameters are subsequently used by the current controller 134 to generate the voltage command for the motor 19. The controller parameters include a targeted bandwidth (or natural frequency for example for a second order system) and other similar parameters that are used for generating the voltage command. Further, the "final parameters" (for example, the $K_p$ and/or $K_i$ gains in a PI type controller, which are described further) that are used by the current controller 134 to generate the voltage command are based on the controller parameters and the estimated motor control parameters.

Figure 4:
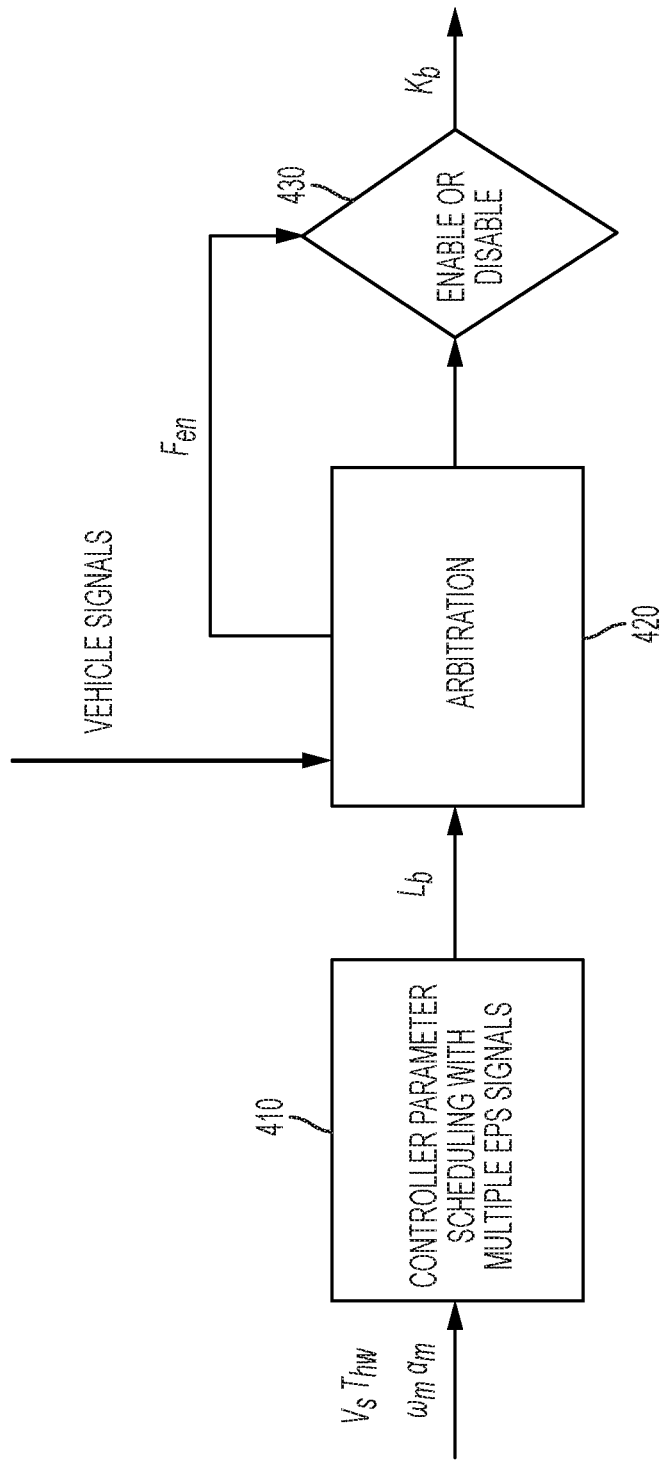
FIG. 4 depicts a dataflow block diagram of the dither noise reduction provided by the dither noise manager according to one or more embodiments.

FIG. 4 depicts a dataflow block diagram of the dither noise management provided by the dither noise manager 138 according to one or more embodiments. Dither noise is typically audible at lower motor velocities when the vehicle is near stall, where the other vehicle noises are low. When the motor 19 rotates faster or the vehicle speed is high, dither noise gets masked by the other noises (such as the engine noise). The dataflow block diagram depicts a method for varying filtering parameters in real-time as a function of the one or more EPS signals and thereafter performing an arbitration. The arbitration monitors the motor control parameter value variations due to different signatures of the one or more EPS signal signatures and determines the final value of the controller parameters based on dither noise requirements along with steering system as well as vehicle stability conditions. Each signal is used to generate a different set of current controller parameters, which are then combined or arbitrated by the arbitration (420).

The method for dither noise management accordingly facilitates to filter the noise frequencies in the dither range (for example, in the range 200 to 400 Hz; however, the range may be different for different systems). In some cases, depending on stability or performance conditions, the filtering may be disabled altogether by the method as described further.

The individual EPS signals are used to produce different tuning parameters $L_b$ to reduce dither noise, at 410. The EPS signals used can include a vehicle speed ($v_s$), a handwheel torque ($T_{hw}$), a motor velocity ($\omega_m$), and a motor acceleration ($\alpha_m$), among other signals. The tuning parameters $L_b$ (which is a matrix or a set, not a scalar) are sent arbitrated to produce final parameters $K_b$ along with an enable/disable flag ($F_{en}$), at 420. The enable/disable flag can disable the bandwidth scheduling altogether, at 430.

For example, by monitoring other vehicle signals (such as lateral acceleration), it may be determined that the vehicle needs the EPS system 40 to have faster dynamic response even if the dither noise is amplified. In this case, the bandwidth settings due to scheduling can be ignored and set to sufficiently high (pre-determined calibration) value.

The arbitration may utilize multiple signals to determine situations where the motor control bandwidth modification is not to be modified for ensuring stability of the EPS system 40. Based on the determination, the enable/disable flag disables the filtering and modifying of the controller parameters that are being used by the current controller 134. If the filter enable/disable flag indicates that the dither noise management is to be performed, the estimated controller parameters are modified and supplied to the current controller 134.

For instance, for a current controller 134 of first order, the current control loop transfer function is:

$$H_{dq}(s) = \frac{\omega_{bdq}}{s + \omega_{bdq}}. \qquad \text{Eq. (1)}$$

Here, $\omega_{bdq}$ is the bandwidth of the d or q axis current control closed loop, and is an example of the one or more controller parameters that the current controller 134 uses to generate the voltage command. In one or more examples, the dither noise manager 138 schedules the targeted closed loop current control bandwidth, i.e. modifies the controller parameters as a function of the motor control parameters, and the vehicle signals 190 (e.g. motor acceleration and handwheel torque in addition to motor velocity and vehicle speed). Accordingly, $$\omega_{bdq} = f(\omega_m, \alpha_m, v_s, T_{hw}) \qquad \text{Eq. (2).}$$

Here, $f$ is a function that is based on the criteria for minimizing the space where filtering is to be performed such that dither noise is reduced while the stability and performance of the system degradation is minimized. The motor acceleration reduces performance degradation during fast reversals where the motor velocity may be low but the acceleration is high. Hence, as is typically done, scheduling the bandwidth using only the motor velocity alone may not produce a desired steering feel for an operator of the EPS system 40. Similarly, using only the handwheel torque for scheduling the bandwidth does not produce an optimal steering feel for the operator.

Further, different current controllers can be designed to have different frequency response characteristics. For instance, a coupled PI design with static feedforward compensation (i.e., where the current controllers consist of two independent PI controllers for the d- and q-axes and have a feedforward component which is the same as the feedforward voltage that would be typically used for pure static feedforward compensation) can produce the following dq current transfer functions:

$$H_d(s) = \frac{\left((K_{pq} + \tilde{R})s + K_{id}\right) + s^2 \omega_e \tilde{\omega}_e L_q \tilde{L}_d}{(L_d s^2 + (R + K_{pd})s + K_{id})} ; \qquad \text{Eq. (3a)}$$
$$\frac{(L_q s^2 + (K_{pq} + R)s + K_{iq})}{(L_q s^2 + (K_{pq} + R)s + K_{iq}) + s^2 \omega_e^2 L_d L_q}$$

$$H_q(s) = \frac{\left((K_{pq} + \tilde{R})s + K_{iq}\right) + s^2 \omega_e \tilde{\omega}_e L_d \tilde{L}_q}{(L_d s^2 + (R + K_{pd})s + K_{id})} . \qquad \text{Eq. (3b)}$$
$$\frac{(L_d s^2 + (K_{pd} + R)s + K_{id})}{(L_q s^2 + (K_{pq} + R)s + K_{iq}) + s^2 \omega_e^2 L_d L_q}$$

Here, L represents inductance of the motor 19, R represents resistance of the motor 19, $K_p$ and $K_i$ represent gains of the current controller 134, $\omega_e$ represents motor velocity, and s represents a derivative (Laplacian) term. It should be noted that in the present document the suffixes d and q represent values in the respective reference axis frame, and the tilde (~) terms represent estimated values. The $K_p$ and $K_i$ are final parameters that are part of the one or more controller parameters used for generating the voltage command.

In these cases (Equations 3a and 3b), the PI gains for the d and q axis may be scheduled with motor velocity, acceleration, vehicle speed, and handwheel torque. Accordingly, the motor current control frequency response characteristics and in turn, the torque control transfer functions can be used to perform low pass filtering to conditionally filter out the noise in the handwheel torque sensor signals.

A current controller 134 utilizes an inverse model of the motor 19 using the controller parameters to generate the voltage command (V). The controller parameters can be varied based on the motor control parameters. The current controller 134 may be static or dynamic in nature. In the case of current controller 134 that is dynamic, derivative terms are employed for computing the voltage command. In one or more examples, the voltage command computation may be implemented using continuous time techniques and then discretized. Alternatively, or in addition, the voltage command computation can be directly designed in the discrete domain. An example of a discrete derivative in continuous time is as follows.

$$\tilde{s} = \frac{s}{(\tau s + 1)^n}. \quad \text{Eq. (4a)}$$

In the above representation of the derivative, s is the pure derivative term and $$\frac{1}{\tau s + 1}$$

represents a low pass filter. Typically, using a low pass filter in combination with the pure derivative aids in modifying the undesirable high frequency response of the pure derivative term. In one or more examples, $\tau$ is set to a predetermined value. Here, $\tau$ is a current controller parameter in the case where the current controller 134 is a dynamic feedforward current controller. The continuous time derivative may be implemented in discrete time (z domain), for example, by using Tustin approximation (or other techniques) as follows.

$$s = \frac{2}{T_s} \frac{1 - z^{-1}}{1 + z^{-1}} \quad \text{Eq. (4b)}$$

Here $T_s$ is the discrete control loop sampling time. It should be noted that the approximate derivative may be implemented in other ways, including by changing the continuous time approximation, by using different discrete time approximations of the continuous time equivalents, or by directly designing the derivative term in the discrete domain.

A current control transfer function of the current controller 134 with the aforementioned derivative approximation that is computed dynamically is as follows.

$$T_{dd}(s) = \frac{L_q \tilde{L}_d s \tilde{s} + L_q \tilde{R} s + \tilde{L}_d R \tilde{s} + \omega_e \tilde{\omega}_e \tilde{L}_d L_q}{L_d L_q s^2 + R(L_d + L_q)s + R^2 + \omega_e^2 L_d L_q}; \quad \text{Eq. (5a)}$$

$$T_{qq}(s) = \frac{L_d \tilde{L}_q s \tilde{s} + L_d \tilde{R} s + L_q \tilde{R} \tilde{s} + \omega_e \tilde{\omega}_e \tilde{L}_q L_d}{L_d L_q s^2 + R(L_d + L_q)s + R^2 + \omega_e^2 L_d L_q}. \quad \text{Eq. (5b)}$$

In the equations 5a and 5b, the derivative terms cause noise transmission and amplification. Accordingly, modifying the derivative terms facilitates shaping the frequency response of the motor control system 130.

Figure 5:
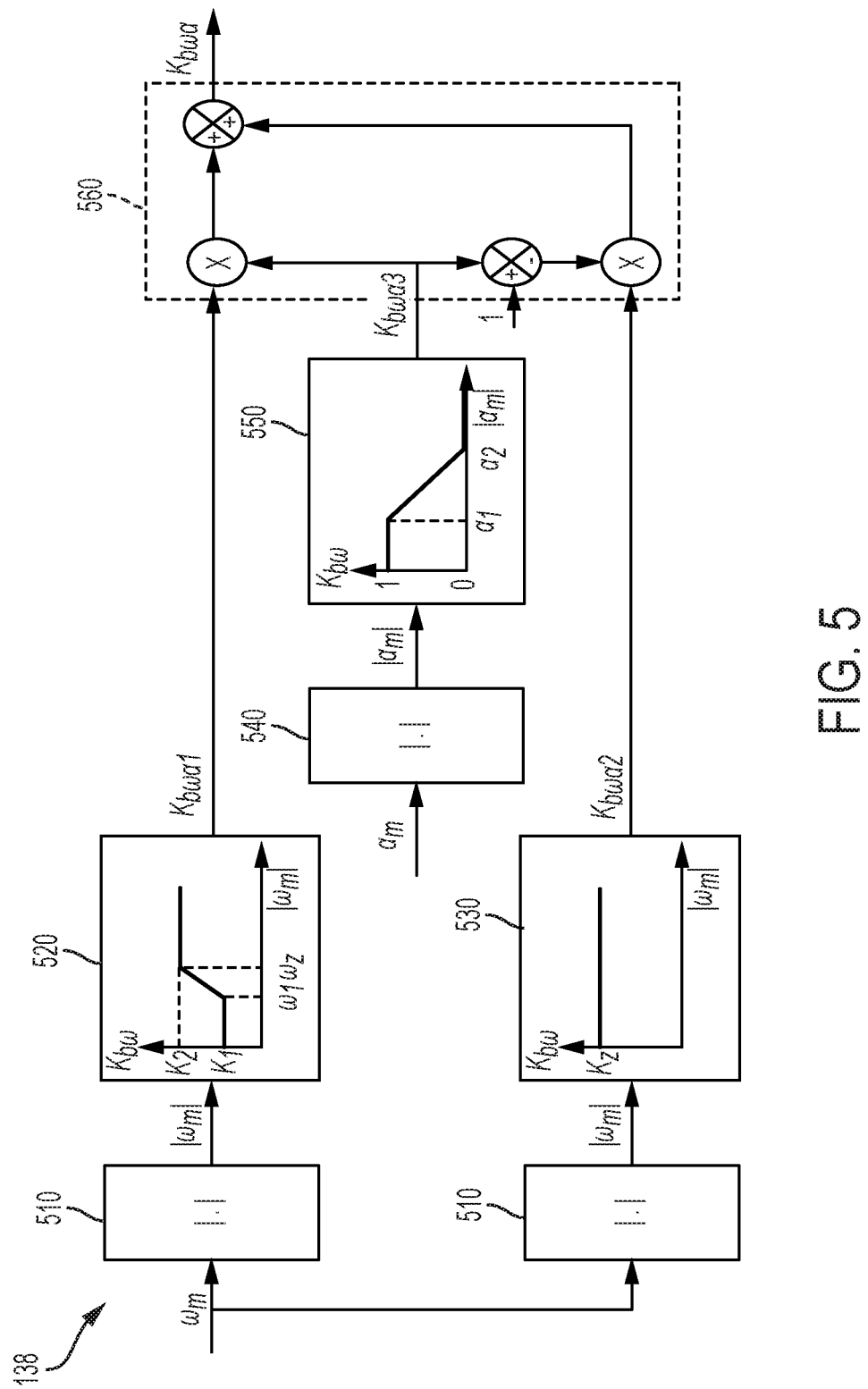
FIG. 5 depicts a block diagram for scheduling the bandwidth with the one or more EPS signals according to one or more embodiments.

FIG. 5 depicts a block diagram for scheduling the bandwidth with the one or more EPS signals according to one or more embodiments. In the illustration, $K_{b\omega\alpha}$ refers to the final parameter of the current controller 134, particularly in case of a dynamic feedforward current controller, after the individual parameter scheduling with different EPS signals and arbitration are performed by the dither noise manager 138. In the illustrated example, the dither noise manager 138 uses only two EPS signals, the motor velocity and the motor acceleration. However, in other examples, other EPS signals including vehicle speed, handwheel torque, etc. are used in a similar manner.

An absolute value of the motor velocity is determined, at 510. A first parameter ($K_{b\omega\alpha 1}$) is determined based on the motor velocity value, at 520. The first parameter can be determined using a look up table or a predetermined function that is computed at runtime. In one or more examples, the one or more parameters are computed using a low-pass filter (or any other filter) for the motor velocity. Dither noise is most audible when the motor velocity is low (i.e., the handwheel is stationary). As the motor velocity increases, the dither noise gets masked by other noises, such as those due to the mechanical system 170, and filtering is not performed. Hence, the current control response cutoff frequency may be scheduled to be low at lower motor velocities and vice versa. An example of the cutoff frequency scheduling versus motor velocity is shown in FIG. 5 (at 520).

As depicted in the example of FIG. 5, the first parameter is kept at a value of $K_1$ at motor velocities less than $\omega_1$, then increased linearly from $\omega_1$ to $\omega_2$ and then kept at a higher value $K_2$ above velocities of $\omega_2$. This operation may be mathematically represented as follows.

$$K_{b\omega\alpha 1}(\omega_m) = \begin{cases} K_1, & |\omega_m| < \omega_1 \\ K_1 + (\omega_m - \omega_1)\frac{K_2 - K_1}{\omega_2 - \omega_1}, & \omega_1 \leq |\omega_m| < \omega_2 \\ K_2, & |\omega_m| \geq \omega_2 \end{cases}$$

It should be noted that the while the function is shown to be piecewise linear, any other function may be used instead as long as the trends are similar. For instance, a nonlinear function involving an exponential function as shown below may be used instead.

$$k_{b\omega\alpha 1}(\omega_n) = \max\left(\alpha, 1 - e^{-\frac{|\omega_m|}{a}}\right)$$

Here, $\alpha$ is a tunable parameter that may be changed to vary the shape of the cutoff frequency function.

Further, a second parameter ($K_{b\omega\alpha 2}$) is computed using the absolute value of the motor velocity, at 530. The second parameter can be determined using a look up table or a predetermined function that is computed at runtime.

It should be noted that other functions or tables from those depicted in FIG. 5 can be used to determine the first parameter and second parameter values.

An absolute value of the motor acceleration value is determined, at 540. The motor acceleration value is used to compute a third parameter ($K_{b\omega\alpha3}$), at 550. In one or more examples, the third parameter is a binary (ON/OFF) value, such as 1 or 0. The third parameter may be determined using a look up table or a predetermined function that is computed at runtime.

The first parameter, the second parameter, and the third parameter are combined to compute the final parameter of the current controller 134, at 560. In one or more examples, the combining includes computing $$K_{b\omega\alpha} = (K_{b\omega\alpha3} \times K_{b\omega\alpha1}) + ((1 - K_{b\omega\alpha3}) \times K_{b\omega\beta}) \quad \text{Eq. (7)}.$$

In other examples, the combining can be performed in a different manner. Further, as noted earlier, in other examples, the final parameter is computed using additional parameters that are based on other EPS signals.

In one or more examples, in addition to or alternatively of using the motor velocity, the dither noise manager 138 uses the vehicle speed to adjust the parameters of the current controller 134. At high vehicle speeds, the engine noise masks the dither noise, so the cutoff frequency may be increased at such conditions to improve performance and maintain stability. At stall or near stall conditions (i.e., low vehicle speeds) dither noise is highly audible, and hence the cutoff frequency is kept low. Functions similar to the ones presented above are used for velocity and/or vehicle acceleration.

Further yet, in one or more examples, the dither noise manager 138 may further use handwheel torque to adjust the parameters of the current controller 134. Dither noise is modeled as a function of both the magnitude and frequency content of handwheel torque. The noise is significantly audible at higher load conditions (i.e., at higher values of handwheel and motor torque). Hence, filtering is only performed above a particular threshold value of handwheel torque. An example function (hard switch) is shown in FIG. 6.

Figure 6:
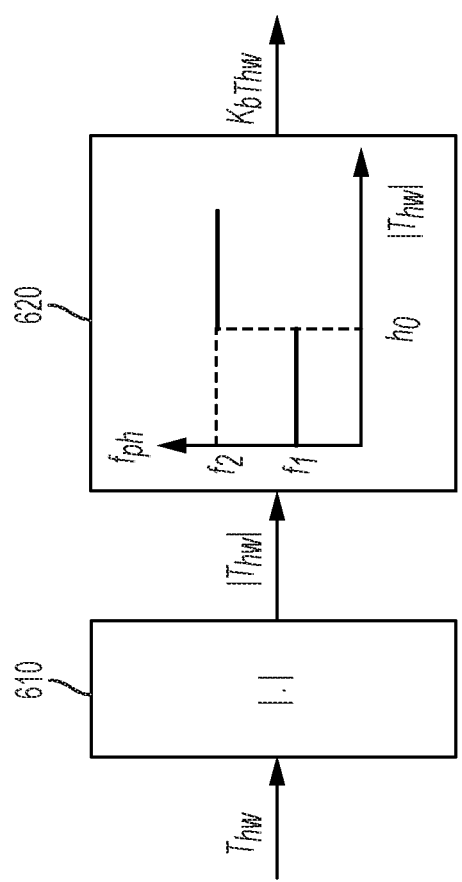
FIG. 6 depicts adjustment parameter scheduling versus handwheel torque magnitude according to one or more embodiments.

As depicted in the FIG. 6, an absolute value of the handwheel torque input signal is computed (at 610) and used to calibrate the parameters ($K_{bThw}$) of the current controller 134 (at 620). In the illustrated example a step function is used where the controller parameters are configured based on the value of the handwheel torque.

Figure 7:
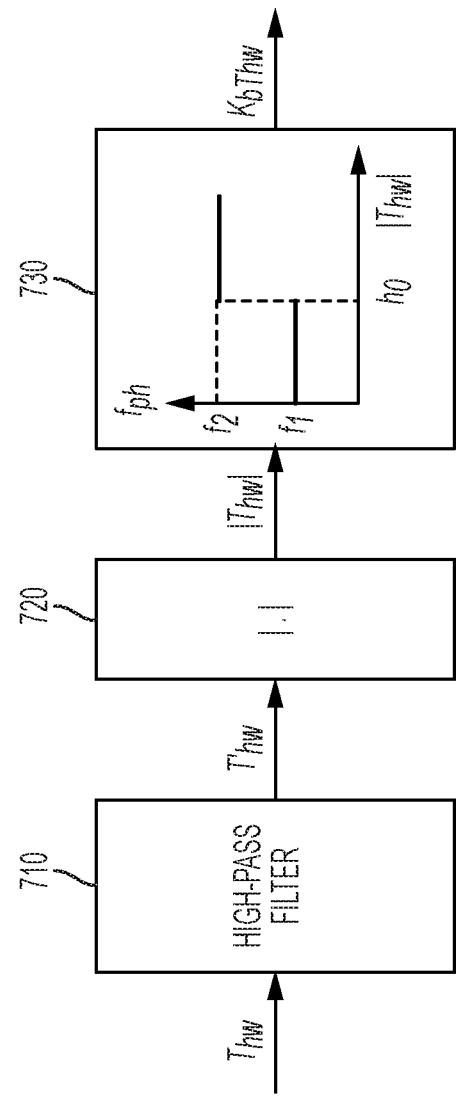
FIG. 7 depicts adjustment parameter scheduling versus handwheel torque frequency content according to one or more embodiments.

FIG. 7 depicts controller parameter scheduling versus handwheel torque frequency content according to one or more embodiments. The handwheel torque frequency content can include a band/range of frequencies. During fast maneuvers, the high frequency content of the handwheel torque signal is high in proportion in comparison with other frequency content in the handwheel torque signal. Hence, the controller parameters may be scheduled as a function of the frequency content of handwheel torque. FIG. 7 depicts an example of this scheduling function. In the example, the handwheel torque input signal is first filtered by a high-pass filter 710 and the filtered high-pass content ($T'_{hw}$) is used to determine the adjusted controller parameters. As described herein, an absolute value of the high-pass content ($T'_{hw}$) is computed (at 720) and used to determine the parameters ($K_{bThw}$), which is used to adjust the parameters of the current controller 134 (at 730). For example, the parameter ($K_{bThw}$) is set to a predetermined value $f_1$ if the high-pass content ($T'_{hw}$) is below a predetermined value ($h_0$) and a predetermined higher value $f_2$ is used if the high-pass content ($T'_{hw}$) is above (or equal) to the predetermined value $h_0$.

In one or more examples, the dither noise manager 138 computes the final parameters using the multiple input signals as described herein. An arbitration (560) is performed using the multiple parameters that are determined based on the respective EPS signals, motor velocity, motor acceleration, vehicle speed, handwheel torque, and the like. The arbitration determines the final parameters (in real-time) that the current controller 134 uses to compute the voltage command. The final parameter is then used by the current controller 134 for computing the voltage command V based on the input current commands ($I_{dq}^*$).

While the arbitration determines the final parameters from the determined multiple parameters in several ways, the key is to ensure that vehicle and steering system stability is always ensured, even at the cost of dither noise (if needed). The dither noise filtering can be disabled, for example if the stability of the EPS system 40 is being threatened.

FIG. 5 depicts an example arbitration for a combination of two EPS signals used. It is understood that different types of arbitration may be used based on the combination of the EPS signals being used for filtering the dither noise. In one or more examples, a weighted sum can be performed for computing the final parameter using the multiple parameters corresponding to each of the EPS signals. It should be noted that the terms "first", "second", "third", and "fourth" parameters used in the description above can be varied in other examples, and that in some examples the number of parameters computed can be different than the examples described herein.

The dither noise manager 138, accordingly, facilitates scheduling the parameters of the current controller 134 as functions of the one or more EPS signals in order to reduce (filter) the dither noise due to the source (handwheel torque). By modifying the parameters of the current controller 134 in this manner ensures that the performance and stability of the overall motor control system 130 is degraded in the minimum possible space of operating conditions of the EPS system 40. Accordingly, the technical solutions described herein modify the performance of the motor control system 130 and in turn improve the performance of the EPS system 40, in turn by reducing (filtering) the dither noise of the EPS system 40. Further, it should be noted that the reduction in the dither noise is performed without using a separate filter component, such as a low pass filter that is typically used, and instead the parameters of the current controller 134 are modified in a manner to reduce the dither noise. Thus, the production cost of the motor control system 130, and in turn of the EPS system 40 reduces.

As described herein applying a motor torque command can include converting the motor torque command into a voltage/current command that is applied to the motor 19 to generate an amount of torque specified by the motor torque command.

Figure 8:
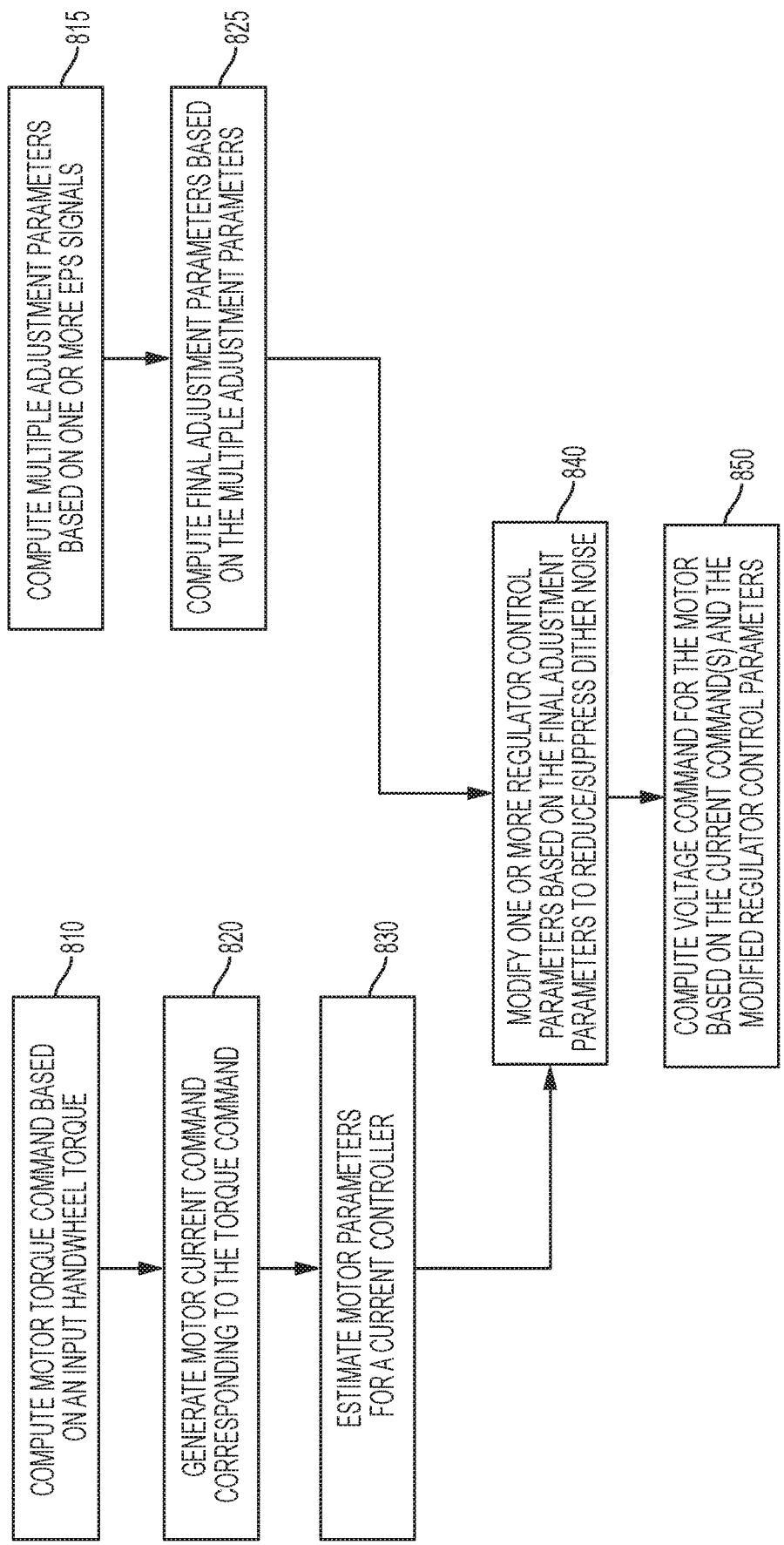
FIG. 8 depicts a flowchart for a method to manage dither noise in an EPS system according to one or more embodiments.

FIG. 8 depicts a flowchart of a method for reducing/filtering dither noise in a steering system according to one or more embodiments. The method includes computing a motor torque command based on a handwheel torque provided to the EPS system 40, at 810. The method further includes generating a current command corresponding to the torque command, at 820. The method further includes determining the estimated motor parameters (L, R), at 830.

In conjunction, the method includes computing multiple adjustment parameters based on one or more EPS signals, such as the motor velocity, the motor acceleration, the vehicle speed, the handwheel torque, and the like, at 815. The "adjustment parameters" here are the one or more parameters described herein, such as the first parameter, the second parameter, etc. based on the corresponding EPS signals.

The method further includes computing the final adjustment parameters based on the multiple adjustment parameters, at 825. Computing the final parameters can include arbitrating the multiple adjustment parameters. The arbitration may include comparing the adjustment parameters with each other and/or using predetermined threshold values. In one or more examples, the arbitration may include selecting a lowest (minimum) adjustment value. Alternatively, or in addition, the arbitration may include selecting a highest (maximum) adjustment value. Alternatively, or in addition, the arbitration may include selecting both the lowest and highest values. In yet other examples, the arbitration can include combining the adjustment parameters into the final parameter, such as using a weighted sum of the adjustment parameters, or any other such techniques.

The method further includes modifying one or more controller parameters based on the final adjustment parameters to reduce/suppress dither noise in the steering system, at 840. The controller parameters are modified based on the one or more estimated motor parameters and/or vehicle control signals 190. The modification can include replacing the one or more controller parameters with the final adjustment parameters. Alternatively, or in addition, the modification can include multiplying the one or more controller parameters with the adjustment parameters. Other combination of mathematical operations is possible in other examples.

The method further includes computing the voltage command for the motor 19 based on the current command(s) and the modified one or more controller parameters, at 850.

The one or more embodiments of the technical solutions described herein address the technical challenge of attenuating dither noise typically present in electric steering systems. The noise generally contains frequency noise content, the range of frequency noise may vary for different systems, and is typically around 200 to 250 Hz. In some cases the frequency range of the noise may coincide with the software loop rates, or may include frequency noise due to PWM and inverter switching. Present technical solutions to attenuate the dither noise include lowering motor control responsiveness or bandwidth, oversampling and filtering of handwheel torque, direct (unconditional) low pass filtering of handwheel torque, and responsiveness reduction of control functions that amplify noise. In one or more examples, a combination of such techniques is used, however using multiple techniques requires coordinated and cumbersome tuning due to multiple functions involved, and long tuning time due to cyclic nature of such tuning process. Further, such techniques result in degraded steering feel and stability. The technical solutions described herein address the technical challenge of attenuating the dither noise in steering systems by filtering motor torque command, the filtering performed using the low-pass filter nature of the motor control system. The technical solutions described herein thus reduce dither noise while maintaining performance and stability of the steering system. Further, the technical solutions provide dither noise management by adjusting the motor parameters that are used for computing the voltage command, reducing the calibration and tuning time, and eliminating need for a separate low pass filter.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate in scope with the present disclosure. Additionally, while various embodiments of the present disclosure have been described, it is to be understood that aspects of the present disclosure may include only some of the described embodiments or combinations of the various embodiments. Accordingly, the present disclosure is not to be seen as limited by the foregoing description.

Having thus described the present disclosure, it is claimed:

1. A method for attenuating dither noise in a steering system, the method comprising:
   computing a torque command based on an input torque;
   generating a current command corresponding to the torque command;
   filtering, using a high-pass filter, a handwheel torque associated with a handwheel torque signal indicating a torque applied to a handwheel of the steering system;
   setting a controller parameter value to a first predetermined value in response to an absolute value of the filtered handwheel torque being less than a threshold and to a second predetermined value in response to the absolute value of the filtered handwheel torque being greater than or equal to the threshold;
   determining, using at least a magnitude of a motor acceleration and the controller parameter value, an adjustment parameter;
   reducing dither noise of the steering system by changing frequency response characteristics of a motor current controller by modifying the controller parameter value of the motor current controller based on the adjustment parameter; and
   generating a voltage command using the current command and the modified controller parameter value, the voltage command used to generate torque by a motor of the steering system.

2. The method of claim 1, wherein the adjustment parameter is further determined based on at least one other signal of a plurality of steering system signals comprising a motor velocity, and a vehicle speed.

3. The method of claim 2, wherein the adjustment parameter is determined by:
   computing a first parameter based on a first steering system signal from the plurality of steering system signals;
   computing a second parameter based on a second steering system signal from the at least one other signal of the plurality of steering system signals; and
   computing the adjustment parameter by arbitrating the first parameter and the second parameter, the controller parameter value modified using the adjustment parameter.

4. The method of claim 3, wherein the adjustment parameter is further determined by:
   computing a third parameter based on a third steering system signal from the plurality of steering system signals; and
   computing the adjustment parameter by arbitrating the first parameter, the second parameter, and the third parameter.

5. The method of claim 3, wherein the arbitrating comprises selecting a maximum parameter of the first parameter and the second parameter.

6. The method of claim 3, wherein the arbitrating comprises computing a weighted sum.

7. The method of claim 1, wherein the voltage command is generated using the current command.

8. An apparatus for managing dither noise in a steering system, the apparatus comprising:
a motor of the steering system; and
a motor current controller configured to:
generate a current command corresponding to a motor torque command;
generate a voltage command based on the current command using one or more controller parameters of the motor current controller;
filter, using a high-pass filter, a handwheel torque associated with a handwheel torque signal indicating a torque applied to a handwheel of the steering system;
set a controller parameter value of the one or more controller parameters to a first predetermined value in response to an absolute value of the filtered handwheel torque being less than a threshold and to a second predetermined value in response to the absolute value of the filtered handwheel torque being greater than or equal to the threshold;
determine, using at least a magnitude of a motor acceleration and the controller parameter value, an adjustment parameter; and
filter the dither noise of the steering system by changing frequency response characteristics of the motor current controller by modifying the controller parameter value of the one or more controller parameters of the motor current controller based on the adjustment parameter, wherein the motor current controller generates the voltage command corresponding to the current command more controller parameters to be using the modified controller parameter value of the one or more controller parameters, the voltage command used to generate torque by the motor.

9. The apparatus of claim 8, wherein the motor current controller is further configured to determine the adjustment parameter based on at least one other signal of a plurality of steering system signals comprising a motor velocity, and a vehicle speed.

10. The apparatus of claim 9, wherein the adjustment parameter is determined by:
computing a first parameter based on a first steering system signal from the plurality of steering system signals;
computing a second parameter based on a second steering system signal from the at least one other signal of the plurality of steering system signals; and
computing the adjustment parameter by arbitrating the first parameter and the second parameter.

11. The apparatus of claim 10, wherein the adjustment parameter is further determined by:
computing a third parameter based on a third steering system signal from the plurality of steering system signals; and
computing the adjustment parameter by arbitrating the first parameter, the second parameter, and the third parameter.

12. The apparatus of claim 10, wherein the arbitrating comprises selecting a maximum parameter of the first parameter and the second parameter.

13. The apparatus of claim 10, wherein the arbitrating comprises computing a weighted sum.

14. The apparatus of claim 8, wherein the motor current controller is further configured to perform feedforward current control.

15. A steering system comprising:
a motor that generates an amount of torque corresponding to a motor torque command;
a motor current controller that generates a voltage command based on the motor torque command, the voltage command being applied to the motor to generate the amount of torque; and
a plurality of sensors that measure a plurality of steering system signals,
wherein the motor current controller:
filters, using a high-pass filter, a handwheel torque associated with a handwheel torque signal indicating a torque applied to a handwheel of the steering system;
sets a controller parameter value of one or more controller parameters to a first predetermined value in response to an absolute value of the filtered handwheel torque being less than a threshold and to a second predetermined value in response to the absolute value of the filtered handwheel torque being greater than or equal to the threshold
determines, using at least a magnitude of a motor acceleration and the controlled parameter value, an adjustment parameter; and
reduces dither noise in the steering system by changing frequency response characteristics of the motor current controller by modifying, based on the adjustment parameter, the controller parameter value of the one or more controller parameters used to compute the voltage command.

16. The steering system of claim 15, wherein the motor current controller computes the voltage command using the modified controller parameter value of the one or more controller parameters.

17. The steering system of claim 16, wherein the motor current controller computes the voltage command using a feedforward control loop using an input current command that is based on the motor torque command.

18. The steering system of claim 15, wherein the adjustment parameter is determined by:
computing a first parameter based on a first steering system signal from the plurality of steering system signals, wherein the first steering system signal corresponds to the magnitude of a motor acceleration;
computing a second parameter based on a second steering system signal from the plurality of steering system signals; and
computing the adjustment parameter by arbitrating the first parameter and the second parameter, the one or more controller parameters modified using the adjustment parameter.

19. The steering system of claim 15, wherein the motor current controller reduces dither noise in the steering system based on at least one other signal of the plurality of steering system signals, wherein the plurality of steering signals comprises at least two of a motor velocity, and a vehicle speed.

* * * * *